(12) United States Patent
Esker

(10) Patent No.: US 6,535,926 B1
(45) Date of Patent: Mar. 18, 2003

(54) TIME SYNCHRONIZATION SYSTEM FOR INDUSTRIAL CONTROL NETWORK USING GLOBAL REFERENCE PULSES

(75) Inventor: Lawrence W. Esker, Concord, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/409,958

(22) Filed: Sep. 30, 1999

(51) Int. Cl.[7] ............................................. G06F 15/16
(52) U.S. Cl. ...................... 709/248; 709/400; 713/400; 713/401; 713/500; 713/503; 713/600
(58) Field of Search ................................ 709/248, 400; 713/400, 401, 300, 303, 600

(56) References Cited

U.S. PATENT DOCUMENTS

| | | | | |
|---|---|---|---|---|
| 5,896,524 A | * | 4/1999 | Halstead, Jr. et al. ........ | 709/400 |
| 5,991,280 A | * | 11/1999 | Ichiyoshi ..................... | 370/321 |
| 6,157,957 A | * | 12/2000 | Berthaud ..................... | 709/248 |
| 6,308,280 B1 | * | 10/2001 | Joseph et al. ................ | 713/400 |
| 6,324,586 B1 | * | 11/2001 | Johnson ....................... | 709/248 |
| 6,351,821 B1 | * | 2/2002 | Voth ............................. | 713/600 |
| 6,389,547 B1 | * | 5/2002 | James et al. ................. | 713/400 |

* cited by examiner

*Primary Examiner*—Saleh Najjar
(74) *Attorney, Agent, or Firm*—Keith M. Baxter; Alexander M. Gerasimow; William R. Walbrun

(57) ABSTRACT

Local clocks used for coordinating events in an industrial control system may be synchronized using time messages transmitted on standard communication networks. A master industrial controller incorporates a time values in a time messages transmitted to the other controllers, the time value indicating the tie of occurrence of an independent global synchronizing pulse. All controllers also capture the local time of the global synchronizing pulse and these times may be compared to the time message from the master industrial controller to deduce a time error value independent of network messaging delays. The error value is used to correct the local clocks.

14 Claims, 2 Drawing Sheets

TIME SYNCHRONIZATION SYSTEM FOR INDUSTRIAL CONTROL NETWORK USING GLOBAL REFERENCE PULSES

CROSS-REFERENCE TO RELATED APPLICATIONS

STATEMENT REGARDING FREDERALLY SPONSPORED RESEARCH OR DEVELOPMENT

BACKGROUND OF THE INVENTION

The present invention relates to industrial controllers used for real-time control of industrial processes and in particular to a method of synchronizing clocks among multiple industrial controllers connected by a network, wherein the synchronizing method is applicable to a wide variety of different network protocols.

Industrial controllers are special-purpose computers used for controlling industrial processes and manufacturing equipment. Under the direction of a stored program, the industrial controller examines a series of inputs reflecting the status of the controlled process and changes the series of outputs controlling the industrial process. The inputs and outputs may be binary, that is on or off, or analog providing a value within a continuous range of values.

An industrial controller differs from a conventional computer in that the various components of the industrial controller may be separated by a considerable distance commensurate with the expanse of a large factory or manufacturing operation. Separated industrial controllers communicate via digital messages transmitted over one or more communication networks including well-known standards of EtherNet, DeviceNet, ControlNet, Fire Wire, Field Bus, SERCOS and ATM. Each of these networks employs different communication protocols. Inter-communication among industrial controllers using different standards is facilitated by the availability of application-specific integrated circuits (ASIC) providing for low-level formatting and queuing operations necessary to interface to the communication media The networks between industrial controllers necessarily introduce a delay in the communication between controllers depending on the distance between controllers and the amount of message traffic. In order to reduce this delay, time critical messages may be assigned a high priority on the network, where high priority messages obtain use of the shared communication media in preference to low priority messages.

Normally, even high priority message experience some delay both because of the competition between high priority messages and because the proportion of message carrying capacity of the communication network allocated to high priority messages is limited to ensure that low priority messages will also be guaranteed transmission. As a result, extremely accurate timing of control actions at a remote industrial controller cannot be obtained.

It is known to moderate the effects of network delay on the timing of control actions by providing each industrial controller with an accurate local clock to which control activities may be synchronized across the entire network of controllers. A control event may be linked to a particular time and transmitted in a control message to the industrial controller in advance of the time the control event must be performed. The actual execution of the control event is then triggered by the local clock of each controller without concern about the time of receipt of the control message.

Likewise, data being accepted by a given controller may be "time stamped" with the value of the controller's clock so that the data's precise time of arrival may be determined by another controller, even though the message transmitting the data to the other controller may be delayed.

For these approaches to be successful, the local clocks used by the networked industrial controllers must be synchronized precisely with each other. This can be done by transmitting from one master clock a time message holding a time value to which the other clocks will be synchronized. Unfortunately the time message is subject to the same network induced delays as the control messages. These significant and unpredictable delays will be reflected in errors in synchronization between local clocks.

One method of addressing the effects of network delay on delaying the transmission of the time message is to place the time value of the master clock in the time message the moment the time message is transmitted on the network's physical medium. In this way all network delay caused by queuing of the time message with other messages is eliminated and the local clocks can be synchronized within the error caused by the relatively short propagation delay on the physical media.

Unfortunately, such an "on-the-fly" modification of the time message to reflect the current master clock time value is difficult. As mentioned above, the task of preparing a message for transmission is usually performed by a specialized integrated circuit which may not include this capability. A time synchronization system which requires fundamental changes in standard hardware will be difficult and costly to implement for multiple networks.

What is needed is a method of synchronizing local clocks among industrial controllers that are connected by a variety of standard communication networks.

BRIEF SUMMARY OF THE INVENTION

The present invention avoids the need to modify standard ASICs used for network communication among industrial controllers and largely eliminates the effect of delay in the transmission of the time message by use of a global synchronously transmitted reference pulse followed later by a linked time message. The reference pulse, which carries with it no explicit time value, may be a "heartbeat" signal used in many communication protocols or may be an external pulse derived from a system such as global positioning satellites. The time message then provides the time value of the reference pulse. All industrial controllers record the time values of their local clocks upon the occurrence of the reference pulse, then upon receipt of the time message, adjust their local clocks according to the difference between the time value of the time message and the recorded time of the reference pulse. By separating the reference pulse from the time message, conventional messaging may be used for transmission of the time message without concern about its delay.

Specifically, the present invention provides a method of synchronizing local clocks among industrial controllers communicating on a network to a time value of a master clock in a first industrial control device. The method includes the steps of detecting at the first industrial controller a global reference pulse and storing the time value of the master clock. This time value is then transmitted by the first industrial controller as a time message on the network to the other industrial controllers. A second industrial controller also detects the global reference pulse and stores a value of its local clock at that time. It then receives the time message from the first industrial controller and compares its stored local time with the time value of the time message to deduce an error value. This error value is used to correct the clock of the second industrial controller.

Thus, it is one object of the invention to provide a method of synchronizing local clocks that is indifferent to arbitrary delays introduced by communication protocols in the transmission of time messages. Communication of the global reference pulse outside of the messaging framework frees it from delays inherent in the messaging process. Separating the time value from the reference pulse allows the time value to be communicated separately at an arbitrary time later so as to accommodate the variable delays.

It is another object of the invention to provide a time synchronization system that works well with pre-existing communication standards. Many network protocols include a heartbeat signal transmitted independently of messages at a regular time over the entire network. This heartbeat signal may be used as the global reference pulse subject only to minor propagation delays in the communication media of the network. Alternatively, the global reference pulse may come from a source external to the industrial controllers and independent of their time values. Any periodic signal that may be received by all industrial controllers, for example a reference signal of a global positioning satellite, may be used.

The industrial controllers may include a snapshot register communicating with the local clock of the industrial controller and triggered by detection of the global reference pulse.

Thus it is another object of the invention to provide for extremely rapid acquisitions of time values at a hardware level. Unlike the processing of messages which necessarily proceeds through the ASIC, the reference pulse may be received without delay to trigger the acquisition of a time value by the snapshot register. The snapshot register may be then read at an arbitrary time later allowing the comparison process of the present invention, by which an error value is determined to be performed at a later time by relatively slow speed software.

Generally, the global reference pulse will reoccur at a regular period and the time message will be sent within the one period from occurrence of the global reference pulse. In this way, the linkage of the global reference pulse and the time value of the time message are implicit with each time value referring to the previous global reference pulse measurement.

Thus, it is one object of the invention to provide for an extremely simple linkage of time values and time markers.

Alternatively, the global reference pulse may include a pulse identification code uniquely identifying the global reference pulse among a series of global reference pulses and the time message may include both a time value and a pulse identification code corresponding to the particular global identification pulse with which it is associated. The received time message is then compared at a second industrial controller only to the time value corresponding to a global reference pulse having a pulse identification code corresponding to that contained in the time message.

Thus, it is another object of the invention to accommodate global synchronizing pulses that occur far more frequently than transmission of the time messages or situations where the uncertainty in transmission of the time messages may exceed the periodicity of the global synchronizing pulse.

The foregoing and other objects and advantages of the invention will appear from the following description. In the description, reference is made to the accompanying drawings which form a part hereof and in which there is shown by way of illustration a preferred embodiment of the invention. Such embodiment does not necessary represent the full scope of the invention, however, and reference must be made to the claims herein for interpreting the scope of the invention.

DETAILED DESCRIPTION OF THE INVENTION

Figure 1:
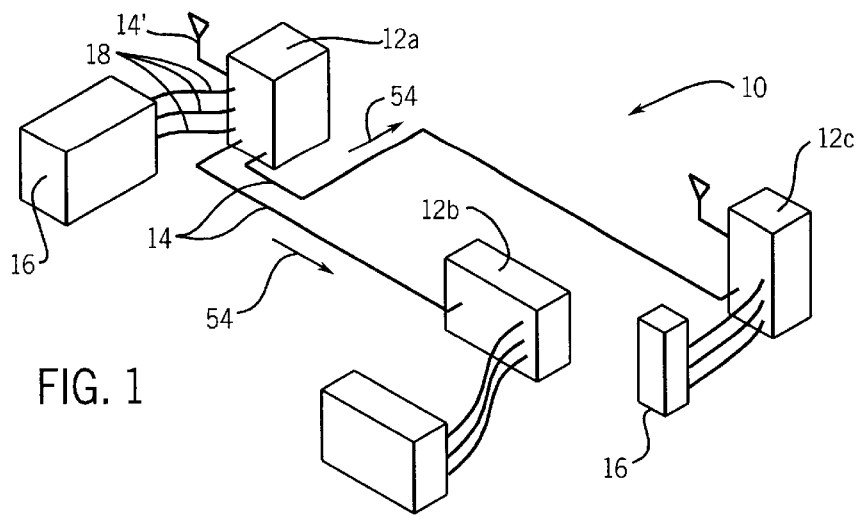
FIG. 1 is a perspective view of a industrial control system having spatially separated controllers having local clocks that must be synchronized.

Referring now to FIG. 1 an industrial control system 10 suitable for use with the present invention, provides a number of separate controllers, 12a–12c, inter-connected by one or more communication networks 14. Generally, networks 14 are optical or electrical cabling as is known in the art, but networks 14 may also include a receiving antennae 14' for a global positioning signal (GPS) or the like.

The controllers 12a–12c communicate with controlled equipment 16 via an input/output (I/O) module 30 communicating with I/O lines 18 to effect a control of the equipment 16 according to stored control programs and data exchanged with the other controllers 12a–12c as is understood in the art. Alternatively, and as is more typical with current controllers 12, the I/O 30 may be in separate units (not shown) communicating with the controllers 12 also via the network 14.

Figure 2:
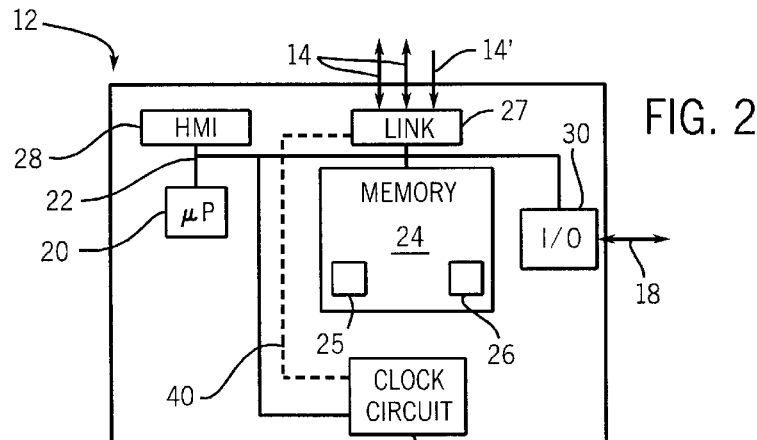
FIG. 2 is a block diagram of one industrial controller of FIG. 1 showing the processor for executing a control program and a synchronization program of the present invention, and a clock circuit for providing a synchronizable local clock.

Referring generally to FIG. 2, each controller 12a–12c includes a processor 20 communicating over an internal bus 22 with electronic memory 24. Memory 24 may hold a stored control program 25 for executing instructions providing for control of the equipment 16, and may also include an operating program 26 providing instructions for implementation of the present invention in the context of multiple connected controllers 12a–12c as will be described below. In the case where the I/O 30 is separate from the controller 12, the controller 12 appears as is depicted in FIG. 2 without the I/O 30 and the I/O lines 18, and the separate I/O 30 is realized by a unit identical to the controller 12 as shown in FIG. 2 without the HMI 28. Where the I/O 30 is separate from the controller 12, the I/O 30 may independently make use of the below described time synchronization of the present inventions.

The bus 22 also connects to a network interface 27 being typically an applications specific integrated circuit (ASIC) providing the protocols necessary for communication between the controllers 12 on the networks 14. Such protocols may include the open standard protocols of EtherNet, ControlNet, Field Bus, Fire Wire, GPS, Sercos, ATM and other protocols well known in the art. A human machine interface (HMI) 28 may also be connected to the bus 22 to provide for local control by operators of the equipment 16.

I/O circuits 30 either contained in the controller 12 or in a separate device are connected to the bus 22 to provide an interface to the equipment 16 through I/O lines 18. Bus 22 also connects to a clock circuit 32 which provides a local time value used for time stamping or for triggering execution of instructions of the control program 25.

Figure 3:
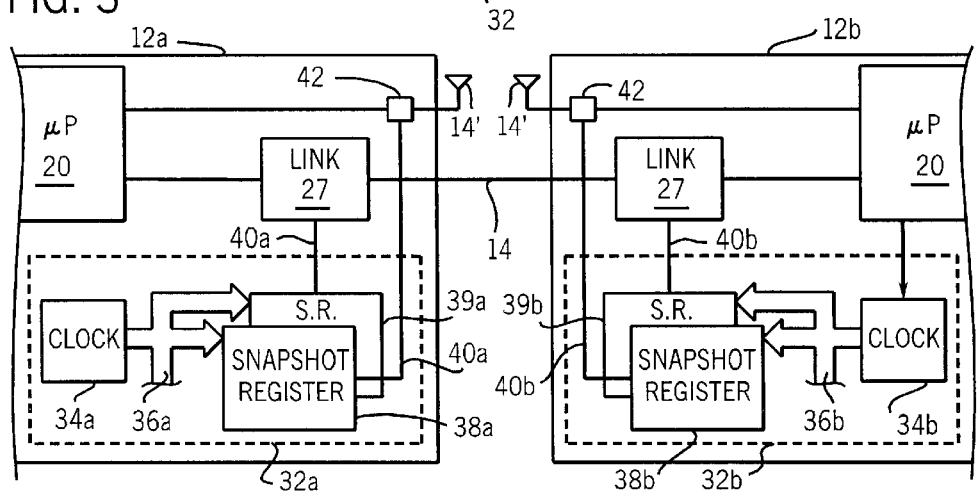
FIG. 3 is a fragmentary view of two industrial controllers per FIG. 1 showing an expanded view of the clock circuit of FIG. 2 for receiving an internal or external global reference pulse.

Referring now to FIG. 3, a master industrial controller 12a includes a clock circuit 32a providing a master clock 34a including an oscillator/counter combination so as to provide a regular time value 36a. The time value 36a may be read by the processor 20 and by one or more snapshot registers 38a, 39a capable of storing the time value 36a upon receipt of a trigger signal 40a.

A second industrial controller 12b includes a local clock 34b which may be identical in functionality to clock 34a providing a local time value 36b although as will be understood from the following description, 34a and 34b may be unique. Local time value 36b may be communicated to processor 20 of industrial controller 12b via a snapshot register 38b or 39b which may receive and store the local time value 36b upon receipt of a trigger signal 40b.

In both of controllers 12a and 12b, the trigger signals 40a or 40b respectively may come a reference pulse either from a GPS receiver 42 communicating with antenna 14' or from the network interfaces 27 of the respective controllers tapping into a heartbeat signal of the network implicit and synchronous over the network 14.

Generally a reference pulse derived from the network 14 will be synchronous among controllers 12a and 12b and will include an ordinal number which may be transmitted as a pulse identification value to the respective processor 20 and which uniquely identifies the pulse with respect to other earlier or later pulses. In contrast, the reference pulse provided from the GPS receiver 42 may not have an identifying number.

Figure 4:
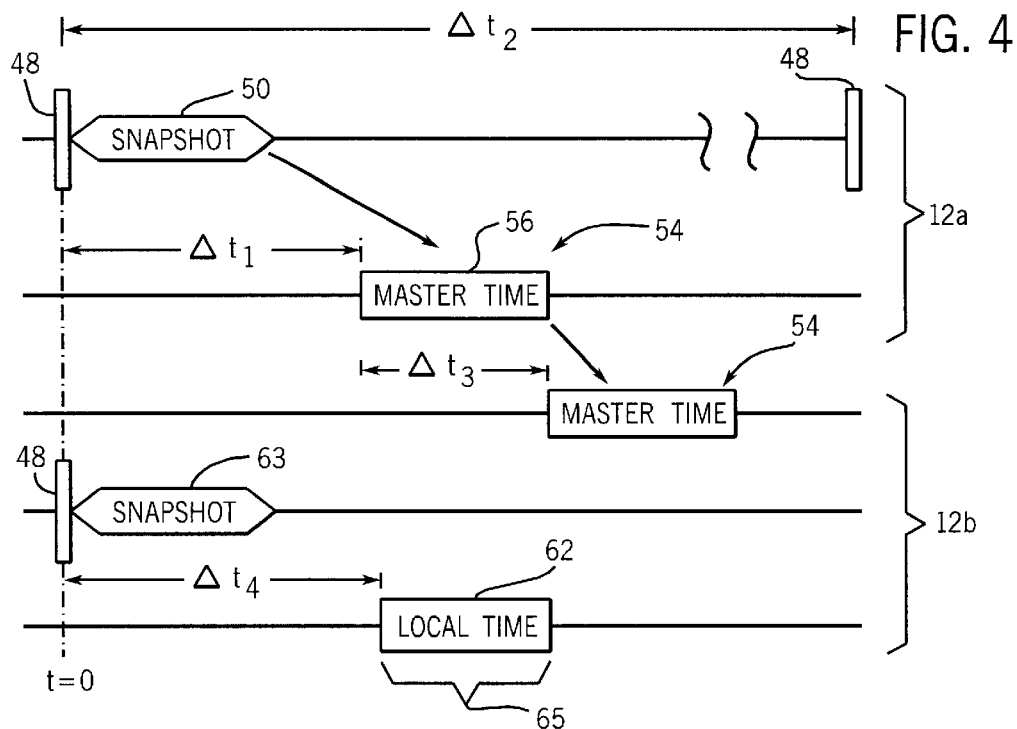
FIG. 4 is a graph showing occurrences of the global reference pulse and various transmissions of time messages on the network as a function of time.
Figure 5:
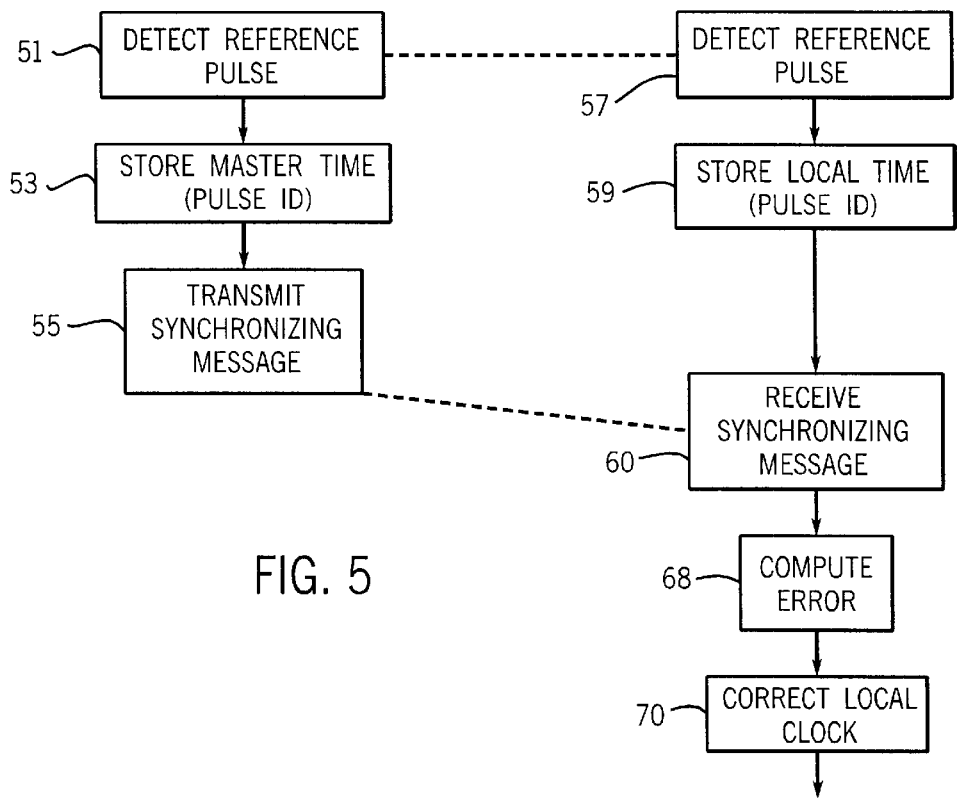
FIG. 5 is a flowchart showing operation of the present invention as realized in the clock circuitry and the synchronization program of FIG. 2.

Referring now also to FIGS. 4 and 5, at a first time t=0, and as indicated by process block 51, global reference pulse 48 may be received at controller 12a. By operation of snapshot register 38a or 39a, a snapshot time value 50 may be acquired at controller 12a shortly after the occurrence of global reference pulse 48. By use of a snapshot register 38a or 39a implemented entirely in hardware, the snapshot time value 50 will be essentially instantaneous with the detection of the global reference pulse 48, however in an alternative embodiment, the snapshot register and capture circuitry may be implemented in software capturing the time of occurrence of the global reference pulse as part of an interrupt service routine subject only to interrupt service routine jitter.

The storage of the snapshot time value 50 of the master clock 34a upon occurrence of the global reference pulse is indicated by process block 53. If the rate of occurrence of the global reference pulse is too high, depending on its source, only every Nth global reference pulse is acquired (where N is an integer greater than 1) and used for time synchronization both to prevent excess use of bandwidth for time synchronization and to prevent possible race conditions in the transmission and receipt of time synchronization messages 54.

An arbitrary time later, a time message 54 may be prepared by processor 20 of the industrial controller 12a including as its components a master time value 56 being identical to the snapshot time value 50. The transmission of the time message 54 is indicated by process block 55.

The amount of time $\Delta t_1$ between the occurrence of the global reference pulse 48 and the transmission of the time message 54 will generally be a function of the queuing by the ASIC of network interface 27 and need not be known so long as the time $\Delta t_1$ is constrained to be less than the value $\Delta t_2$ being the period between successive global reference pulses 48.

Referring still to FIGS. 4 and 5, at time t=0 and as indicated by process block 57, the global reference pulse 48 is also received at controller 12b. By operation of snapshot register 38b or 39b, a snapshot time value 63 may be acquired at controller 12b shortly after the occurrence of global reference pulse 48. The storage of the local time in snapshot register 38b is indicated by process block 59.

At some time $\Delta t_4$ after recording of the local clock value upon occurrence of the global reference pulse 48 at controller 12b, the processor 20 of controller 12b reads the local time value 62 being identical to the snapshot time value 63 and reads the pulse identification value 67 if any. Together the local time value 62 and the pulse identification value 67 form a recorded local time 65.

At a time $\Delta t_3$ after broadcast of the time message 54 on the network 14 it will be received at controller 12b and recorded by the processor 20 is indicated by process block 60. Upon receipt of the time message 54 and as indicated by process block 68, an error value is computed from the difference between the local time value 62 and the master time value 56, indicating accurately a difference between the clocks 34a and 34b shown in FIG. 3 without effect by intervening delays of the network ASICs and even network delays caused by propagation of signals over the network 14 when an external reference pulse is used. This computation of error can be done either with hardware or software.

The error value may be used simply to correct the value of the clock 34b either changing it by the amount of the error value or to gradually move the time value of the clock 34b to reduce the effective error value and to avoid discontinuous time values resulting in the possible loss of particular time values upon which control events may be triggered. The error value may be further or alternatively used to deduce first and second error derivatives reflecting a fundamental difference in frequency between oscillators of clocks 34a and 34a or the rate of change of the frequencies of the oscillators 34a or 34b such as is known generally as frequency and drift.

The computation of these higher ordered error values allows a predictive correction of local clock 34b reducing the total amount of drift of the clock in between receipt of time messages 54. These correction processes are indicated by process block 70 of FIG. 5.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

I claim:

1. A method of synchronizing local clocks among industrial control devices communicating on a network, the synchronizable being to a time value of a master clock in a first industrial control device, the method comprising the steps of:

(a) detecting at the first industrial control device a global reference pulse;

(b) storing at the first industrial control device, a first time value of the master clock at the time of detection of the global reference pulse by the first industrial control device;

(c) transmitting from the first industrial control device a time message on the network containing the stored first time value of the master clock;

(d) detecting at a second industrial control device the global reference pulse;

(e) storing at the second industrial control device, a second time value of a local clock in the second industrial control device at a time of detection of the global reference pulse at the second industrial control device;

(f) receiving at the second industrial control device the time message and comparing the first time value to the second time value to produce an error value; and (g) correcting the local clock of the second industrial control device according to the error value.

2. The method of claim 1 wherein the global reference pulse is a periodic reference signal from a global positioning satellite.

3. The method of claim 1 wherein the global reference pulse is a periodic signal intrinsic to a communications protocol of the network.

4. The method of claim 3 wherein the communications protocol is selected from the group consisting of EtherNet, DeviceNet, ControlNet, FireWire, Sercos, ATM and FieldBus.

5. The method of claim 1 wherein steps (a) and (b) are performed by dedicated circuitry in the first industrial control device including a snapshot register communicating with the master clock and triggered by the detection of the global reference pulse at step (a) and to store the time value of the master clock.

6. The method of claim 1 wherein steps (a) and (b) are performed by a software interrupt routine reading the master clock and triggered by the detection of the global reference pulse at step (a) and to store the time value of the master clock.

7. The method of claim 1 wherein step (d) and (e) are performed by dedicated circuitry in the second industrial control device including a snapshot register communicating with the local clock and triggered by the detection of the global reference pulse at step (d) and to store the time value of the local clock.

8. The method of claim 1 wherein step (f) of computing the error value is performed by a computer processor executing a stored program.

9. The method of claim 1 wherein step (f) of computing the error value is performed by hardware.

10. The method of claim 1 wherein the global reference pulse occurs regularly at a first period and wherein step (c) is performed an arbitrary time after step (a) within a first period after the global reference pulse.

11. The method of claim 1 wherein the global reference pulse occurs at a first rate and wherein steps (a) (b) and (c) are limited to a second rate less than the first rate.

12. The method of claim 1 wherein the error value is a function of the difference between the first and second time values.

13. The method of claim 1 wherein the error value is a function of the rate of change of the difference between the first and second time values to anticipate difference is oscillator speeds underlying the master and local clocks.

14. The method of claim 1 wherein the error value is a function of the second derivative with time of the difference between the first and second time values to anticipate drift in oscillator speeds underlying the master and local clock.

* * * * *